United States Patent

Sato et al.

[15] 3,636,275

[45] Jan. 18, 1972

[54] HEADBLOCK ASSEMBLY OF A MAGNETIC VIDEO TAPE RECORDER

[72] Inventors: Noboru Sato; Tatsumi Nakano, both of Tokyo, Japan

[73] Assignee: Akai Electric Company Limited, Tokyo, Japan

[22] Filed: July 1, 1969

[21] Appl. No.: 838,136

[30] Foreign Application Priority Data

July 3, 1968 Japan....................................43/56568
July 13, 1968 Japan....................................43/49226

[52] U.S. Cl.......................................................179/100.2 T
[51] Int. Cl.......................................G11b 5/48, G11b 21/16
[58] Field of Search............................................179/100.2 T

[56] References Cited

UNITED STATES PATENTS 3,376,395 4/1968 Rumple...........................179/100.2 T
3,404,241 10/1968 Streets et al.....................179/100.2 T
3,319,014 5/1967 Sugawa...............................179/100.2
3,414,684 12/1968 Lichowsky..........................179/100.2
3,504,136 3/1970 Maxey.................................179/100.2

*Primary Examiner*—Bernard Konick
*Assistant Examiner*—Robert S. Tupper
*Attorney*—Sughrue, Rothwell, Mion, Zinn & Macpeak

[57] ABSTRACT

A headblock assembly of a magnetic video tape recorder, comprising a baseplate adapted for being detachably yet rigidly mounted to a chassis panel of the video tape recorder which mounts in turn an upper mounting element and a lower mounting element, these mounting elements being inclined to contacting surface with the said baseplate and relative to the common axis of said elements, a driving electric motor attached to said lower mounting element, a tape drive drum attached to said upper mounting element, a pair of stationary tape guide means mounted on the said upper mounting element and a pair of tape guide-roller means adapted to the said baseplate.

3 Claims, 11 Drawing Figures

HEADBLOCK ASSEMBLY OF A MAGNETIC VIDEO TAPE RECORDER

This invention relates to a headblock assembly for use with a video tape recorder, especially a small-sized video tape recorder.

It is well known in the art of the video tape recorders to have the recordable tape travel skewedly relative to the magnetic headblock assembly for enhancing the relative density of the recorded video signals on the magnetic tape. In such an instance, however, the recorded signals on the traveling tape should run exactly parallel to each other, otherwise, the recorded signals cannot be reproduced with the desired accuracy and the image on the television screen will be distorted or ruined.

The magnetic tape drive mechanism adapted for advancing the tape at a certain angle relative to the headblock assembly has thus demanded a complex device and especially higher accuracy in the machining of the component parts.

It is a conventional practice to provide a tape feed reel and a tape takeup reel at different heights from the base in such a way that the recording tape will travel skewedly relative to the magnetic head drum which is placed between said tape feed and tape takeup reels. This will lead inevitably to considerable contorsional stress generated in the traveling tape and poor contact between the tape and the magnetic head drum. Thus, the smooth recording of the signals on the magnetic tape will be hindered and the magnetic recording tape will occasionally be injured.

It has also been proposed to have a magnetic head drum directly mounted at a certain desired angle relative to a chassis panel of the recording unit. Such arrangement requires generally accurate machining of the component parts of the headblock assembly for attaining the desired relative position thereof to said chassis panel. Moreover, as the headblock assembly is mounted directly to said chassis panel, it has to be detached from the chassis panel whenever it is in need of repair and the headblock assembly thus detached from the chassis panel has to be mounted thereto after carefully adjusting the relative position thereof to the chassis panel, which means a highly troublesome and time-consuming operation.

In view of these drawbacks inherent in the conventional devices, the main object of the present invention is to provide a rotary-type tape feed mechanism comprising guide drum and guide post means mounted as a single unit on a base for facilitating the mounting and removal operation thereof from the stationary headblock assembly, the latter being mounted skewedly to the baseplate rigidly yet detachably mounted to the chassis panel so that the recordable tape may be advanced horizontally without any torsional stress through its travel between a supply reel and a winding reel.

A further object of the present invention is to provide a headblock assembly of the aforementioned type wherein a pair of cone-shaped guide posts are mounted vertically on the base and in the neighborhood of a guide drum fabricated by cutting a single cylinder obliquely relative to the central axle, so as to provide a pair of mounting elements as shown from the drawings for reducing the frictional resistance generated in the tape feed system and also for damping the flutter of the traveling tape.

A further object of the present invention is to provide a headblock assembly of the aforementioned type which may be rigidly and positively mounted relative to the chassis panel through a baseplate secured between said registering mounting elements, said baseplate being mounted on the chassis panel of the video tape recorder by means of setscrews or the like.

A still further object of the present invention is to provide a tape feed mechanism wherein the traveling tape may be very slightly twisted when passing by the cone-shaped guide posts for better contact between the drum and the running tape and for assuring positive recording of the video signals on the recording tape.

It is to be noted that the cylinder may be cut obliquely relative to the central axle thereof at the desired angle for providing two mounting elements by simple machining operation and that the magnetic headblock assembly having the drive motor and the tape guide drum may be positively secured to the chassis panel of the video tape recorder unit in a simplified way without inviting the substantial deviation of the traveling tape from the desired course.

For better realization of the present invention, reference will now be made to the accompanying drawings showing a preferred embodiment thereof.

Figures 1, 2, 3, 4:
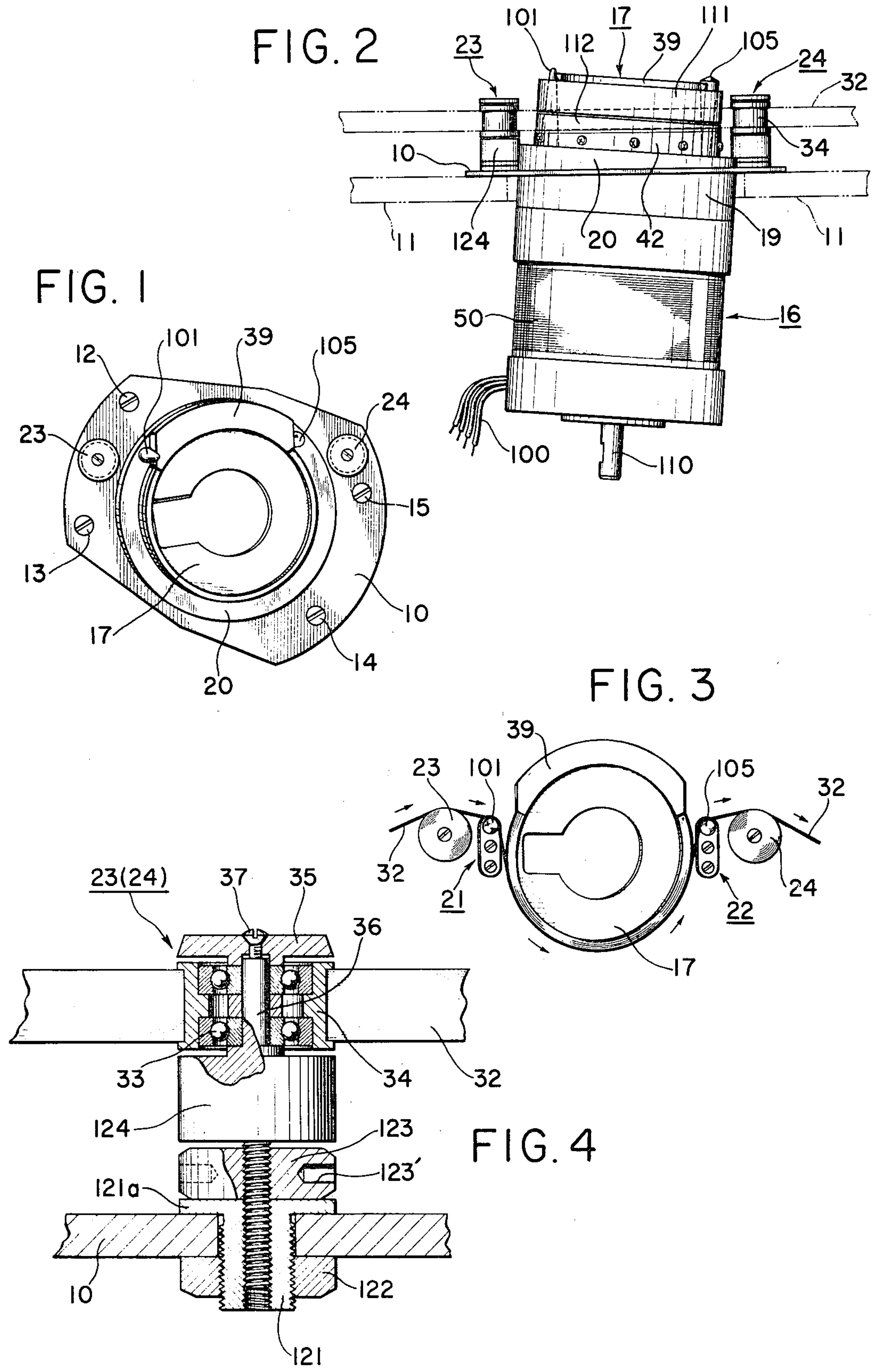
FIG. 1 is a plan view of the headblock assembly according to the present invention.
FIG. 2 is an elevational view of the same.
FIG. 3 is a view showing schematically a tape feed mechanism.
FIG. 4 is a view, shown partly in section, of the tape guide roller means.
Figure 5:
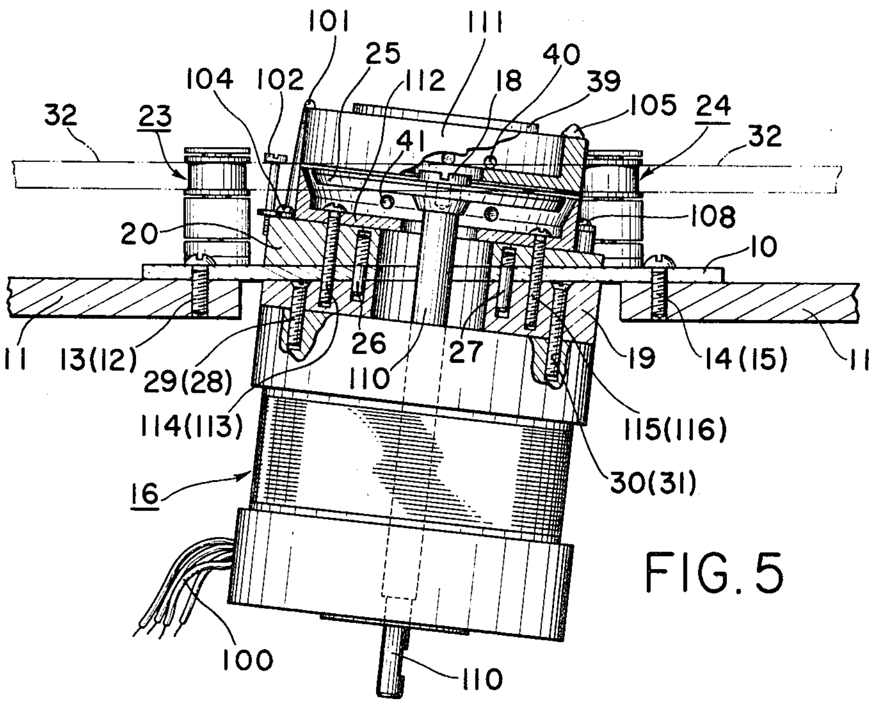
FIG. 5 is a detailed view, shown partly in section, of the headblock assembly.
Figure 6:
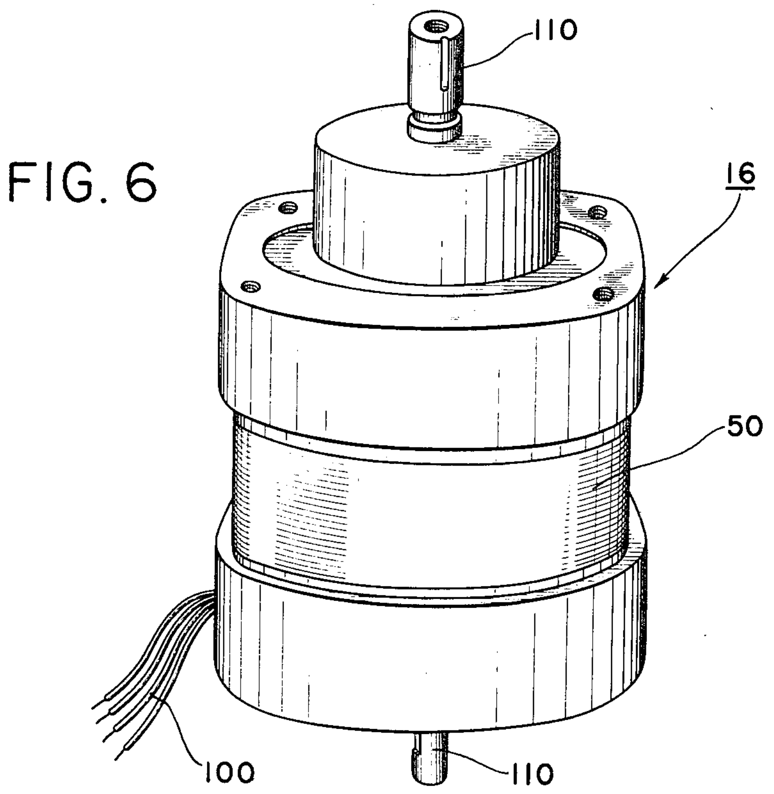
FIG. 6 is a view showing the conventional drive motor to be used with the present invention.

FIGS. 7*a*, 7*b* and 7*c* show in perspective the detailed constructions of the upper mounting element, lower mounting element and a baseplate of the tape feed mechanism, respectively; and FIG. 8*a* and 8*b* are the exploded views showing a guide drum.

In the drawings, numeral 10 denotes a base which is detachably attached to a conventional chassis panel 11, only shown in form of imaginary lines, of a video tape recorder, not shown, by means of a plurality of setscrews 12–15.

Numeral 16 generally denotes a driving electric motor which is of conventional design so that its general outside configuration and its conductors at 100 to be electrically connected to a power source are only illustrated. Numeral 17 denotes a guide drum. A conventional magnetic tape 32 runs around a substantial part of the periphery of the guide drum, as conventionally.

Numeral 19 and 20 denote a lower element and an upper element, respectively, which constitute in combination a mount. These elements 19 and 20 are fabricated from a cylinder as may be most clearly seen from FIG. 7. As shown, the peripheral plane of said both mounting elements 19 and 20 are inclined to the central axle of the cylindrical stop, not shown, from which these elements have been fabricated.

Figure 7:
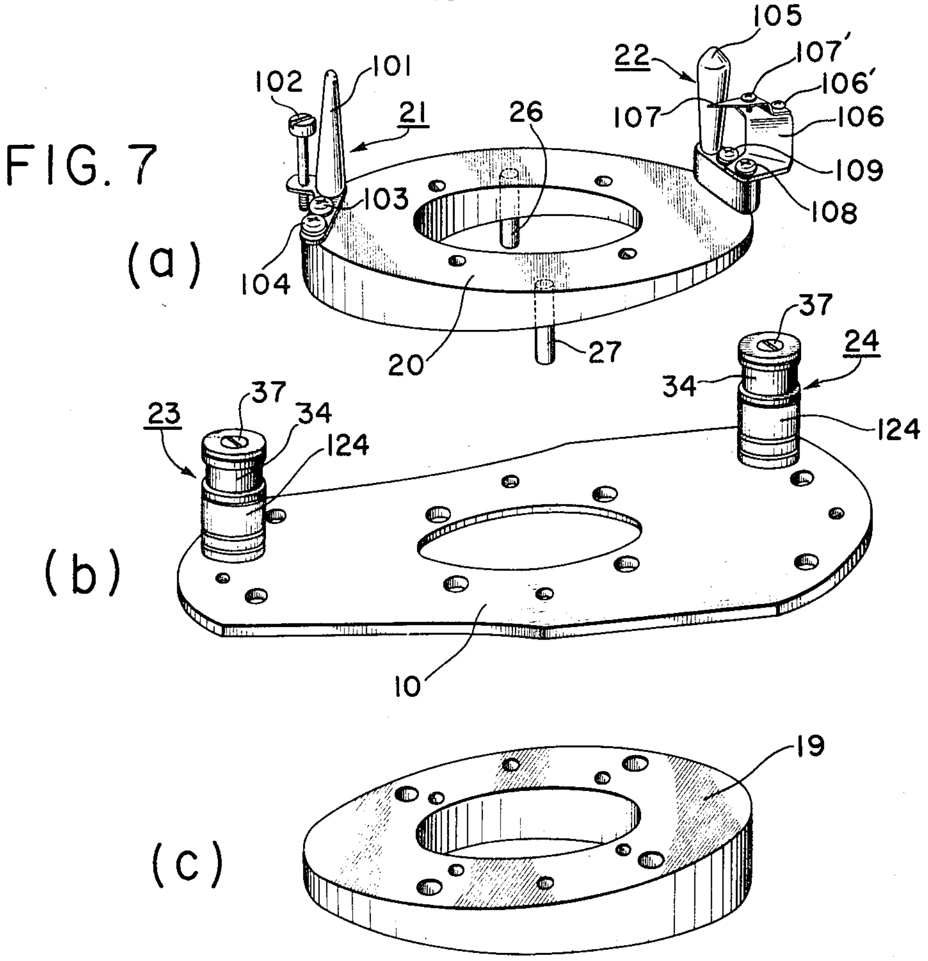

Two tape guide post means 21 and 22 are detachably, yet rigidly attached to the upper surface of upper mounting element 20 by means of setscrew means (see, FIG. 7). Guide post means 21 comprises a main guide post 101 substantially in the form of an elongated cone-type pin and an auxiliary guide post 102 in the form of a headed pin partially formed with a screw thread. Setscrews used for the attaching purpose are shown at 103 and 104. Another guide post means 22 comprises a main guide post 105 shaped substantially into an elongated and inverted cone and an auxiliary post 106 in the form of a channel provided with a tape-positioning means 107 secured thereto by means of setscrew 106′, the tape-positioning means being controlled by screw 107′. Setscrew means for fixedly attaching the channel 106 and the guide pole pin means 22 are shown at 108 and 109, respectively.

The guide roller means 23 and 24 are also detachably, yet rigidly mounted on the plate 10 as seen from FIG. 7*b*.

Now referring to FIG. 4, the guide roller means 23 (or 24) is shown in detail. The guide roller means 23 (or 24) is rigidly attached on the baseplate 10 by a female element 122 and a sleeve 121 integrally provided with a flange **121*a*, the sleeve 121 having a male part for screwing into the element 122. The sleeve 121 is internally threaded and axially receives a shaft 36 therein which is partially threaded and integrally provided with a drum 124 for preventing the tape 32 from erroneously positioning. An auxiliary female element 123** for more rigidly attaching the guide roller means 23 (or 24) to the baseplate 10 is threaded on shaft 36 between the sleeve 121 and the drum 124, a plurality of recesses 123' being formed on the element 123 for receiving any suitable spanner or the like. A freely rotatable guide roller 34 is provided on the axis 36 by means of a plurality of the bearing means 33, and these bearing means 33 and the roller 34 are covered by a cover 35 which is rigidly connected to the shaft 36 by a setscrew 37.

Drive motor 16 comprises a stator 50 and a rotor (not shown), the latter having a motor shaft 110 made rigid therewith. Stator 50 and the lower mounting element 19 are rigidly united together by means of setscrews 28–31. Further, the lower mounting element 19, the baseplate 10, the upper mounting element 20 and the guide roller means 17 are all together rigidly connected by means of setscrews 113–116. In other words, the stator 50 mounting elements 19–20 and guide drum 17 are rigidly attached together to the baseplate 10.

It should be noted that the positioning of the lower element 19, the baseplate 10 and the upper element 20 are easily determined and closely held by utilizing two positioning pins 26 and 27 rigidly provided on the upper element 20.

Figure 8:
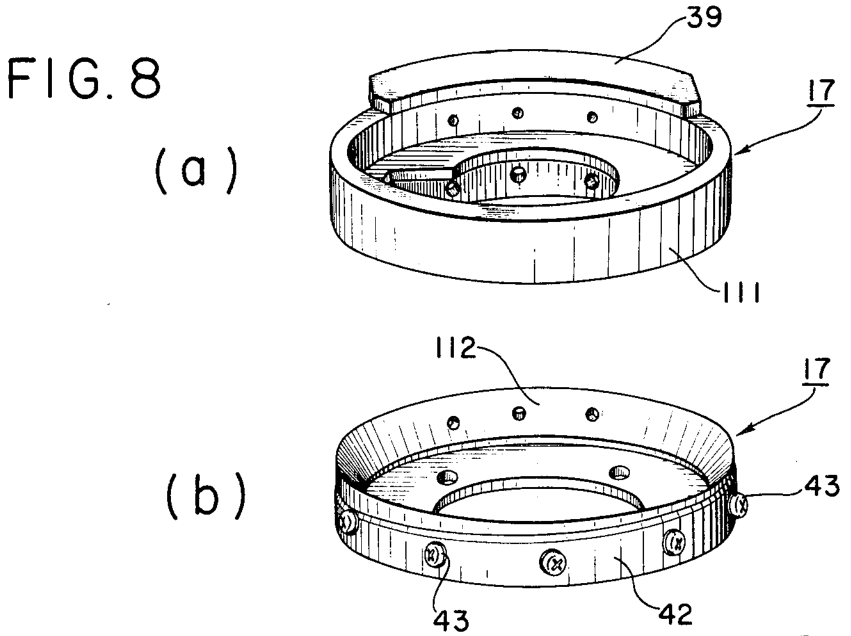

The guide drum 17 comprises an upper element 111 and a lower element 112, these drum elements being fixedly connected to each other by means of a connecting means 39 (as shown in FIG. 8). Setscrews for connecting purpose are shown at 40 and 41. In the guide drum 17 a rotary disc 25 with a head is fixedly attached to the shaft 110 by means of a screw 18. A tape guide panel 42 is provided on a peripheral surface of the lower element 112 by means of setscrews 43. These elements 111 and 112 are centrally perforated for allowing the motor shaft 110 to extend into the hollow inside space of guide drum 17.

FIG. 3 illustrates a tape feed mechanism wherein the advancing direction of the tape is shown by a plurality of arrows. The magnetic tape 32 from a conventional tape feed reel is guided to the head drum 17 by way of the guide roller means 23 and the guide post means 21. It should be noted that the resistance to the running tape when running from the guide post 101 can be reduced considerably by provision of the intermediate guide roller means 23, so that the flutter of the magnetic tape 32 may also be highly attenuated.

Next the magnetic tape 32 is very slightly twisted when passing by the elongated cone-shaped guide post 101 of the guide post means 21 so as to attain an exactly close contact of the tape with the peripheral surface of the guide drum means 17, while the magnetic tape 32 is prevented from coming out of the course by means of a flange part of the auxiliary guide post 102 of the guide post means 21.

Video signals are recorded on the traveling tape by the rotary head mounted on the rotary disc 25, as the latter travels in touching contact with the peripheral surface of the guide drum means 17, while the tape is being guided by the tape guide panel 42, and passed around the peripheral part of the guide drum 17 by about 180°.

The twisted and recorded tape 32 is untwisted so as to resume its undistorted shaped when passing by the inverse cone-shaped post 105. Further, the running tape 32 is adjusted in its course by means of the tape-positioning part 107, and is guided to a takeup reel (not shown) by way of the guide roller means 24 which operates in the same manner as the roller means 23.

The embodiments of the invention in which an exclusive property or privilege is claimed are defined as follows:

1. A headblock assembly for a magnetic video tape recorder having an apertured chassis panel for receiving said assembly wherein said assembly comprises a baseplate, means for securing said baseplate over an aperture in said panel, an upper mounting element and a lower mounting element secured to opposite sides of said baseplate, said elements being complementary to each other to define a right cylinder having an axis disposed at an acute angle to said baseplate, a right cylindrical tape guide drum secured to said upper mounting element and driving means having a shaft coaxial with said drum secured to said lower mounting element.

2. A headblock assembly as set forth in claim 1 wherein a plurality of positionary means are provided for determining the required relative position of said mounting elements and said baseplate.

3. A head assembly as set forth in claim 1 wherein a conical post and an inverted conical post are mounted on said upper mounting element diametrically opposite each other relative to said drum.

* * * * *